March 1, 1960     E. E. RYSKIEWICZ     2,927,025
PHOTOSENSITIVE MATERIALS AND RECORDING MEDIA
Filed Oct. 23, 1956
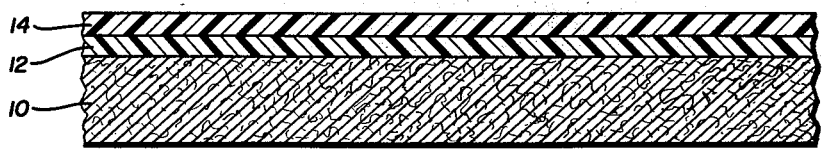
Fig. 1
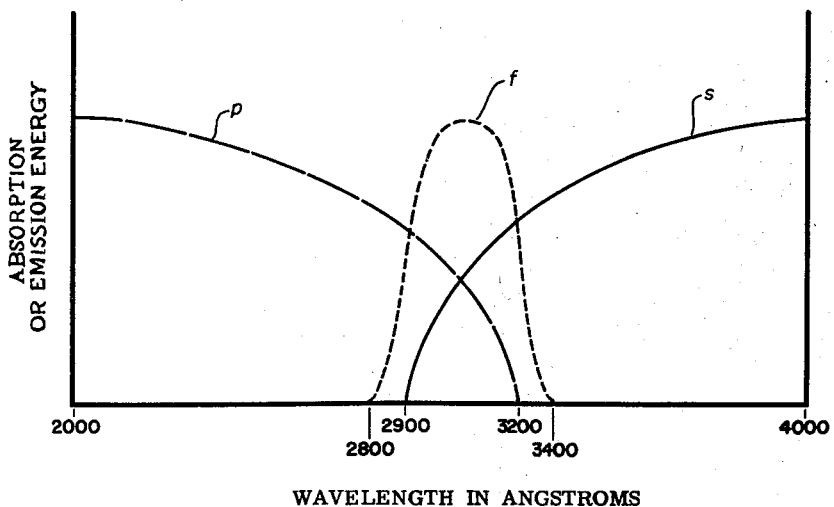
WAVELENGTH IN ANGSTROMS
Fig. 2
INVENTOR.
Edward E. Ryskiewicz
BY 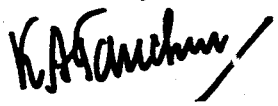

United States Patent Office 2,927,025
Patented Mar. 1, 1960

2,927,025

PHOTOSENSITIVE MATERIALS AND RECORDING MEDIA

Edward E. Ryskiewicz, Mountain View, Calif., assignor to International Business Machines Corporation, New York, N.Y., a corporation of New York Application October 23, 1956, Serial No. 617,769

5 Claims. (Cl. 96—90)

The present invention relates to photo-sensitive materials and to recording media employing such materials. More particularly the present invention relates to photo-sensitive materials and recording media that respond to ultraviolet radiation.

It is an object of my invention to provide photo-sensitive materials that respond to ultraviolet radiations but are stable under normal forms of illumination such as sun light, fluorescent or incandescent light.

Another object of my invention is to provide photo-sensitive materials adapted to respond to short wave ultraviolet radiation to establish an image, which may be handled under normal light conditions, such as sun light, without danger that previously established images will be obliterated.

Still another object of my invention is to provide a simple and inexpensive recording medium upon which information may be recorded with the aid of ultraviolet radiations and which may then be handled under normal light conditions, such as in day light, without danger that the recorded information may be destroyed.

Furthermore, it is an object of my invention to provide a simple and inexpensive recording medium of the type referred to, which may be handled under normal light conditions without danger that it will lose its ability of recording information with the aid of short wave ultraviolet radiations.

These and other objects of my invention will be apparent from the following description of the invention and of the accompanying drawing which illustrates a preferred embodiment thereof and wherein Figure 1 is a fragmentary schematic cross section through a recording sheet embodying my invention; and Figure 2 is a diagram illustrating the photo-sensitivity of a recording sheet of the invention, such as illustrated in Figure 1.

The range of photo-sensitivity of known photo-sensitive materials that respond to short wave ultraviolet radiation extends to some extent into the sun light spectrum and especially into the long wave ultraviolet range of the sun light spectrum as indicated in Figure 2, wherein the curve $p$ represents the photo-sensitivity of a leucocyanide of the triaryl methane dyes and the curve $s$ represents the short wave end of the emission energy of sun light. Although the photo-sensitivity of materials of the type represented by curve $p$ declines rapidly in the ultraviolet range of the sun light spectrum, such materials cannot be handled for very long under normal light conditions without losing their ability to establish recording images with the aid of short wave ultraviolet radiations and without obliteration of recording images previously established thereon.

In accordance with my invention I combine a short wave ultraviolet light sensitive material of the type represented by curve $p$ with a filter material that passes short wave ultraviolet light but which absorbs at least that portion of the sun light spectrum to which the photo-sensitive material responds.

In accordance with my invention the two component materials may be intimately mixed with each other in the same emulsion or the filter material may be applied over a layer of the photo-sensitive material in the form of a cover layer as illustrated in Figure 1, wherein the reference numeral 10 designates a suitable base, such as a sheet of paper, 12 is a thin layer of the photo-sensitive material, and 14 is a cover layer of the proper filter material.

I have found that the hereinbefore mentioned leucocyanides of the triaryl methane dyes and a substance known as 2-methyl-4,5,6,7-tetrachlorobenzotriazole form an ideal combination in the spirit of my invention. The leucocyanides of the triaryl methane dyes are of particular aptitude in the combination of my invention because they are highly sensitive to short wave ultraviolet radiations, and their range of photo-sensitivity extends only to a limited extent into the sun light spectrum. When dissolved in certain acids, for example, carboxylic acids, the resultant solution develops brilliant colors upon exposure to ultraviolet radiations, and once formed, these colors do not fade in darkness and therefore form a permanent record. The 2-methyl-4,5,6,7-tetrachlorobenzotriazole, on the other hand, passes short wave ultraviolet light but forms a sharp cut off for radiations of a wave length longer than 2800 Angstroms, i.e., just outside the short wave end of the sun light spectrum, and its screening action extends to radiations up to a wave length of 3400 Angstroms, which is just beyond the long wave limit of the range of photo-sensitivity of the named leucocyanides, as indicated by the dotted curve $f$ in Figure 2.

For instance, to produce a photo-sensitive filing card in accordance with my invention, I spread a solution of the leucocyanide of pararosaniline containing acid in a thin layer upon a card 10 under light conditions of a wave length of at least 3300 Angstroms, and let it dry so that it forms a thin film (Figure 1) upon said card. I then spread a solution of 2-methyl-4,5,6,7-tetrachlorobenzotriazole in a suitable carrier such as polyvinyl acetate or ethyl cellulose over the film 12 to form a cover layer 14 that absorbs all radiations of wave lengths between 2800 and 3400 Angstroms. After the cover film 14 has dried, the card may be exposed to short wave ultraviolet radiations through suitable stencils to form recording indicia thereon, which are permanent and will not fade in darkness. The card may then be freely handled in daylight and under the usual forms of indoor illumination without obliterating the recording indicia, and it retains its ability to respond to short wave ultraviolet radiations so that additional information may be recorded thereon, if desired, by re-exposing it to short wave ultraviolet radiations through other stencils.

While I have explained my invention with the aid of a particular embodiment thereof, it will be understood that the invention is not limited to the specific component materials given by way of example. Thus, ultraviolet light sensitive materials other than the mentioned leucocyanides and other filter materials than the mentioned filter material may be combined in the manner described hereinbefore as long as these component materials supplement each other in the spirit of my invention to form a system that remains sensitive to ultraviolet radiations above the short wave end of the sun light spectrum but which is insensitive to ordinary light including the long wave ultraviolet range of the sun light spectrum.

I claim:

1. A photo-sensitive material comprising a mixture of a leucocyanide of the triaryl methane dyes and 2-methyl-4,5,6,7-tetrachlorobenzotriazole.

2. A recording card comprising a sheet and applied to said sheet a mixture of a leucocyanide of the triaryl methane dyes and 2-methyl-4,5,6,7-tetrachlorobenzotriazole.

3. A recording card comprising a sheet, a layer of a leucocyanide of the triaryl methane dyes applied to said sheet, and arranged over said layer a covering layer of 2-methyl-4,5,6,7-tetrachlorobenzotriazole.

4. A photo-sensitive material comprising a mixture of the leucocyanide pararosaniline dissolved in a carboxylic acid and 2-methyl-4,5,6,7-tetrachlorobenzotriazole.

5. A recording card comprising a sheet, a layer of a solution of the leucocyanide of pararosaniline in a carboxylic acid applied to said sheet, and spread over said layer a covering layer of 2-methyl-4,5,6,7-tetrachlorobenzotriazole.

References Cited in the file of this patent

UNITED STATES PATENTS

| | | |
|---|---|---|
| 2,075,153 | Wilmans | Mar. 30, 1937 |
| 2,432,419 | Heimbach | Dec. 9, 1947 |
| 2,528,496 | Chalkley | Nov. 7, 1950 |
| 2,569,793 | Anderson | Oct. 2, 1951 |

UNITED STATES PATENT OFFICE

CERTIFICATE OF CORRECTION

Patent No. 2,927,025                      March 1, 1960

Edward E. Ryskiewicz

It is hereby certified that error appears in the printed specification of the above numbered patent requiring correction and that the said Letters Patent should read as corrected below.

Column 3, line 12, after "leucocyanide" insert -- of --.

Signed and sealed this 1st day of November 1960.

(SEAL)
Attest:

KARL H. AXLINE                        ROBERT C. WATSON
Attesting Officer                     Commissioner of Patents